United States Patent
Yu et al.

(10) Patent No.: US 8,543,272 B2
(45) Date of Patent: Sep. 24, 2013

(54) DISTANCE ORIENTED ENERGY MANAGEMENT STRATEGY FOR A HYBRID ELECTRIC VEHICLE

(75) Inventors: Hai Yu, Canton, MI (US); Johannes Geir Kristinsson, Ann Arbor, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 13/198,073

(22) Filed: Aug. 4, 2011

(65) Prior Publication Data

US 2012/0035795 A1 Feb. 9, 2012

Related U.S. Application Data

(60) Provisional application No. 61/370,966, filed on Aug. 5, 2010.

(51) Int. Cl.
*B60W 20/00* (2006.01)

(52) U.S. Cl.
USPC ........................................ 701/22; 180/65.265

(58) Field of Classification Search
USPC .............. 701/22; 180/65.265, 65.275, 65.28, 180/65.29, 65.31, 65.285; 903/903; 318/139, 318/140, 433
See application file for complete search history.

(56) References Cited

U.S. PATENT DOCUMENTS

| | | | |
|---|---|---|---|
| 5,487,002 A | 1/1996 | Diller et al. | |
| 6,487,477 B1 * | 11/2002 | Woestman et al. | 701/22 |
| 6,941,197 B1 | 9/2005 | Murakami et al. | |
| 7,539,562 B2 | 5/2009 | Maguire et al. | |
| 7,865,298 B2 | 1/2011 | Macneille et al. | |
| 7,904,217 B2 | 3/2011 | Miller | |
| 8,260,481 B2 * | 9/2012 | Naik et al. | 701/22 |
| 2005/0228553 A1 * | 10/2005 | Tryon | 701/22 |
| 2006/0278449 A1 | 12/2006 | Torre-Bueno | |
| 2007/0029121 A1 | 2/2007 | Saitou et al. | |
| 2008/0084186 A1 | 4/2008 | Elder et al. | |
| 2008/0150490 A1 | 6/2008 | Koziara et al. | |
| 2009/0114463 A1 | 5/2009 | DeVault | |

(Continued)

FOREIGN PATENT DOCUMENTS

| | | | |
|---|---|---|---|
| JP | 2006113892 A | 4/2006 | |
| JP | 2007062640 A | 3/2007 | |

(Continued)

OTHER PUBLICATIONS

Chambers, plugincars.com/volvo-unveils-plug-hybrid-diesel-v60-124-mpg-mile-batte . . . , "Volvo Unveils Plug-In Hybrid Diesel V60: 124 MPG, 30 Electric Miles, AWD, 0-60 in 6.9 Sec", Feb. 21, 2011, 3 pages.

(Continued)

*Primary Examiner* — Marthe Marc-Coleman
(74) *Attorney, Agent, or Firm* — Brooks Kushman P.C.; David B. Kelley (57) ABSTRACT

A vehicle and a method to control a vehicle includes selecting a trip route for the vehicle using a user interface, generating a charge reference profile of a battery coupled to an electric motor based on the trip, and commanding propulsion devices in the vehicle based on a location of the vehicle with respect to the trip route such that a state of charge (SOC) of the battery tracks the reference profile.

17 Claims, 8 Drawing Sheets

(56) References Cited

U.S. PATENT DOCUMENTS

| | | |
|---|---|---|
| 2009/0150015 A1 | 6/2009 | Okubo et al. |
| 2009/0171522 A1 | 7/2009 | Luo et al. |
| 2009/0259363 A1 | 10/2009 | Li et al. |
| 2009/0326750 A1* | 12/2009 | Ang ............................... 701/22 |
| 2010/0138089 A1 | 6/2010 | James |
| 2011/0022255 A1* | 1/2011 | Yamada et al. ................. 701/22 |
| 2011/0166732 A1 | 7/2011 | Yu et al. |
| 2011/0166733 A1 | 7/2011 | Yu et al. |

FOREIGN PATENT DOCUMENTS

| | | | |
|---|---|---|---|
| JP | 2010028913 | A | 2/2010 |
| WO | 2009042857 | A2 | 4/2009 |
| WO | 2009042857 | A3 | 4/2009 |

OTHER PUBLICATIONS

Volvo Car Corporation, "Stefan Jacoby presents the Volvo V60 Plug-In Hybrid—a second generation hybrid", Mar. 1, 2011, 2 pages.

DeVault, "Just-In-Time Battery Charge Depletion Control for PHEVs and E-REVs for Maximum Battery Life", SAE International, Apr. 20, 2009, 11 pages.

Gong et al., "Trip Based Optimal Power Management of Plug-in Hybrid Electric Vehicle with Advanced Traffic Modeling", SAE International, Apr. 14-17, 2008, 14 pages.

\* cited by examiner

DISTANCE ORIENTED ENERGY MANAGEMENT STRATEGY FOR A HYBRID ELECTRIC VEHICLE

CROSS-REFERENCE TO RELATED APPLICATIONS

This application claims the benefit of U.S. provisional Application No. 61/370,966 filed Aug. 5, 2010, the disclosure of which is incorporated in its entirety by reference herein.

TECHNICAL FIELD

The present disclosure is related to energy management in a hybrid electric vehicle.

BACKGROUND

Vehicles may have one or more source of power and managing the power for improved fuel economy, vehicle efficiency, or for various operating modes may be desirable.

SUMMARY

A method to control a vehicle having electric motor and engine propulsion devices is provided with selecting a trip route for the vehicle using a user interface, generating a charge reference profile of a battery coupled to the electric motor based on the trip, and commanding the electric motor and the engine based on a location of the vehicle with respect to the trip route such that a state of charge (SOC) of the battery follows the reference profile.

Another method of controlling a vehicle having at least one propulsion device includes selecting a trip route, partitioning the trip route into at least one segment, assigning a vehicle mode of operation to each of the at least one segments such that the battery is at a specified state of charge at a specified location of the trip route, and commanding the at least one propulsion device to operate in the vehicle mode of operation assigned to each segments based on a location of the vehicle.

A vehicle is provided with an electric motor, a battery coupled to the electric motor, an engine, with the electric motor and the engine are coupled to wheels of the vehicle via a transmission. The vehicle has a user interface configured for a user to select a trip route for the vehicle. The vehicle also has an electronic control unit (ECU) coupled to the user interface, the electric motor, the battery, and the engine. The ECU is configured to (i) generate a charge reference profile of the battery based on the trip route, and (ii) command the electric motor and the engine based on a location of the vehicle with respect to the trip such that a state of charge (SOC) of the battery tracks the reference profile.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Plug-in Hybrid Electric Vehicles (PHEV) utilize a larger capacity battery pack than a standard hybrid electric vehicle (HEV), and additionally have the capability to recharge the battery from a standard electrical outlet to reduce fuel consumption and to improve the vehicle's fuel economy. The PHEV structure is used in the figures and to describe the various embodiments below; however, it is contemplated that the various embodiments may be used with vehicles having other propulsion devices or combinations of propulsion devices as is known in the art. For example, the vehicle may have an engine and an electric motor, a fuel cell and an electric motor, one or more electric motors, or other combinations of propulsion devices as are known in the art. The engine may be a compression or spark ignition internal combustion engine, or an external combustion engine, and the use of various fuels is contemplated. In one example, the vehicle is a hybrid vehicle (HEV), and additionally may have the ability to connect to an external electric grid, such as in a plug-in electric hybrid vehicle (PHEV).

Besides the gasoline fuel energy, the PHEV also has an additional energy source of electrical energy stored in the battery, which may be electric energy from the electric grid deposited in the vehicle's battery during charging. The power management of the PHEV allocates the drive power demand of the vehicle to one or both of the two energy sources in order to achieve an improved fuel economy and meet the other comparable HEV/PHEV control objectives. While conventional HEVs may be operated in order to maintain the battery State of Charge (SOC) around a constant level, it is often desirable for PHEVs to use as much pre-saved battery electric (grid) energy as possible before the next charge event (when the vehicle is "plugged-in"). To increase fuel economy, the relatively inexpensive, grid-supplied electric energy is preferentially used to save as much gasoline fuel as possible.

Figure 1:
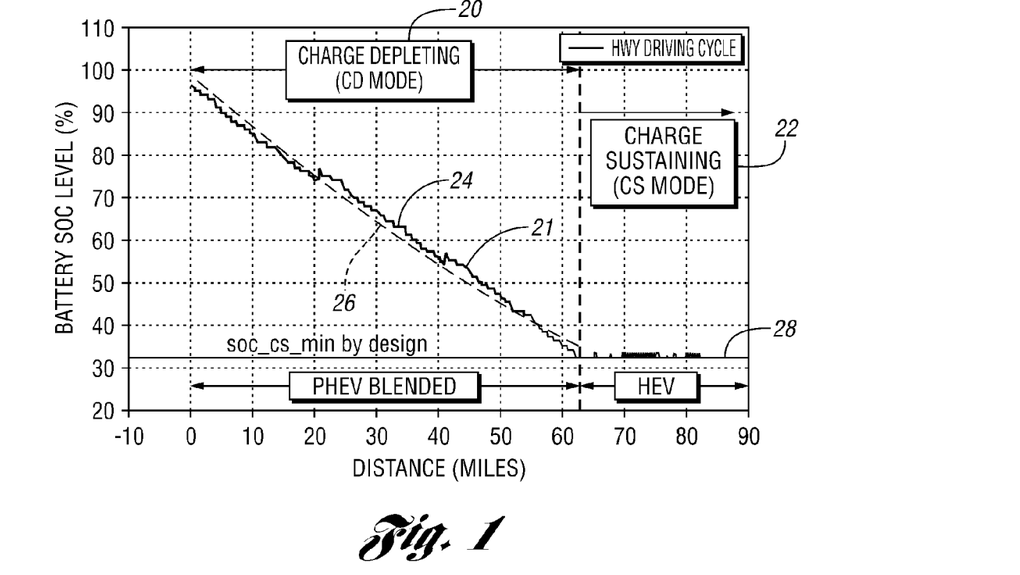
FIG. 1 shows the basic battery energy depletion process for a plug-in hybrid vehicle (PHEV)

The PHEV has two basic operating modes as seen in FIG. 1. In the Charge Depleting (CD) mode 20 the battery electric energy 21 is primarily used to propel the vehicle. The fuel assists the vehicle drive power supply only in certain driving conditions or at excessive drive power requests. One characteristic in the CD mode 20 is that the electric motor consumes more energy from the battery 21 than can be regenerated. In the Charge Sustaining (CS) mode 22 (or HEV mode) the vehicle reduces the electric motor propulsion usage to be able to keep the battery's State of Charge (SOC) 21 at an even or approximately even level.

The CD mode 20 has two sub-modes. In the default Electric Vehicle (EV) mode the electric motor is used as much as possible (with or without help from the gasoline engine depending on PHEV strategy) for vehicle propulsion, depleting the battery at its maximal allowable discharging rate under certain driving patterns/cycles.

The special Controlled Battery Depletion mode (Ctrl'd) mode 24, as shown in FIG. 1, regulates the PHEV battery charge depletion rate in a controlled manner with respect to a reference profile 26. In this mode the electric energy usage is limited in order to achieve a specific target SOC after a given distance, i.e. the battery SOC depletion rate vs. traveling distance is controlled. This PHEV energy management control method is disclosed in provisional patent application Ser. No. 61/335,447, filed Jan. 6, 2010, which is assigned to the assignee of this application. The contents of the co-pending application are incorporated herein by reference.

Once the battery SOC 21 decreases to a predefined charge sustaining level 28 (soc_cs_min), the vehicle switches to CS mode 22, where the battery SOC 21 is kept within a vicinity of the charge sustaining SOC level, and the vehicle is primarily powered by the engine (fuel energy). A Battery SOC Hold function sets the battery SOC at a SOC level at or above the minimum SOC of the battery (e.g. at 50% SOC) and operates the vehicle in a CS mode at that level, which allows the user to manage his/her vehicle operation mode as well as using the battery as an energy source for other utility or entertainment purposes.

In order to extend PHEV operational flexibility such as to enable City-friendly drive and other optimal energy allocation purposes, as disclosed in provisional application Ser. No. 61/335,458, filed Jan. 7, 2010, which is assigned to the assignee of the present application and whose contents are incorporated by reference herein, the user has the ability to select the preferred PHEV operation mode actively between electric and hybrid operation (EV/HEV) such that the vehicle emissions, noise, and the like may be controlled along the trip. For example, the user may start with an HEV driving mode 28 (battery charge sustaining at high SOC) in the initial section of the trip. This saves the battery electric energy 21 such that the user can later switch to an EV driving mode 24 when he/she is in an urban area where the emission and noise are strictly regulated, or another location where EV operation of the vehicle is desirable.

Various embodiments further extend the PHEV operation flexibility by allowing an automated Ctrl'd mode, and it also enables the user to plan the energy usage for multiple sections of a trip in advanced.

Of course, any SOC reference profile may be used with the vehicle. For example, the SOC reference profile may deplete the battery over the trip, while having segments within the trip that are charging the battery, or increasing the SOC. Alternatively, the SOC profile may be a charging profile such that the battery SOC at the end of this trip is the same or higher than what the SOC was at the beginning of the trip.

Figure 2:
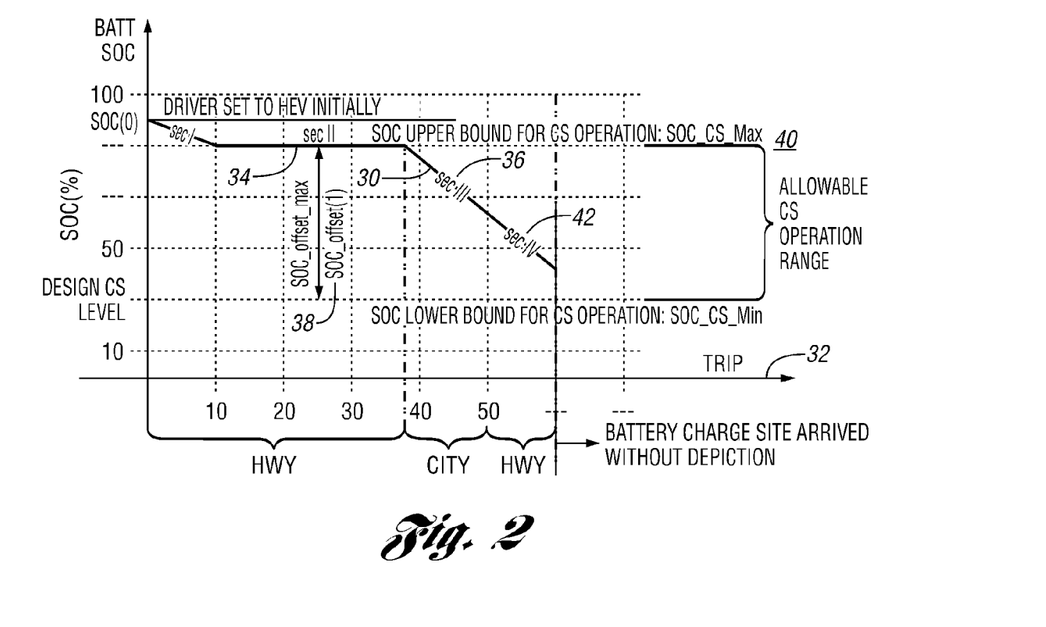
FIG. 2 shows battery SOC/distance plot in a use case in which the energy is not optimized in the trip domain (battery is not fully depleted at the end of the charge cycle)

When the user selects a preferred PHEV operation mode using an interface in the vehicle, such as EV/HEV buttons, the user's inputs may disrupt the normal vehicle energy management strategy and the overall vehicle energy usage may not be optimized in the full trip domain. An example is provided in FIG. 2, which plots the battery SOC reference profile 30 for various operating modes. During this trip 32, the user initially selected HEV mode 34 to reserve the battery energy for later in the trip, in order to drive in an EV mode or City-Friendly in Section III 36. Once HEV mode 34 was selected, the soc_offset 38 is set to soc_offset_max to start the battery charge sustaining (CS) operation, which occurs when the battery SOC reaches the soc_cs_max level 40, as shown by Section II. However, since the battery SOC is kept at a high level at soc_cs_max 40, operation of the vehicle cannot deplete the battery completely during (city) Section III 36 or in the following (highway) Section IV 42. As a result, the vehicle arrives at its next battery charging station at the end of the trip 32 with an un-exhausted battery. This causes the overall fuel economy for the trip 32 to be degraded since more fuel could have been saved if all available electric energy had been used. The example in FIG. 2 demonstrates that if a simple vehicle operation mode switch is used incorrectly, it is difficult to achieve the energy management objectives or less than the potential fuel economy is reached.

In order to provide the vehicle user the flexibility of vehicle mode selection while still achieving at or near an optimized fuel economy, a vehicle feature called "i-Trip" may be used. This feature carries out trip domain battery energy usage pre-planning based on available trip information, real time transportation/traffic information, vehicle states (e.g. battery SOC), the user's operation selections, and the like.

When the iTrip feature is activated, the user can select, in advance, sections of the trip that will run in either EV/HEV mode just as if the buttons were used, but the system may compensate in the remainder of the trip to meet the desired operating modes and obtain an optimal fuel economy over the entire trip. The system uses the user inputs to create a distance-based mode-map over the trip, as well as a reference charge rate profile, which may include depletion, charging or sustaining sections. Optionally, the system may be able to consider pre-defined zoning information, real-time traffic and transportation information, and advanced map information when the mode-map and reference profile are created.

When a battery charge reference profile has been generated from input of the user, the vehicle control algorithm uses the mode-map to automatically switch among the operation modes and (for some modes) directly control the battery usage, in order to make the battery charge usage rate and battery SOC follow the reference profile.

The assumption for this feature is that the user (and other vehicle systems) provides advance information (distances, sections, the regions to cross and stay, the surrounding environment, speed ranges and expected driving mode etc.) about a planned trip. Given this knowledge, the Energy Management System may pre-plan the vehicle energy usage such that the electric energy reservation can be allocated quasi-optimally for the trip. Additionally, the user also has the freedom to actively manage the energy usage for his/her vehicle. The more a user uses the vehicle, the better he/she can understand the vehicle energy usage property, which will lead to familiarity and better optimization that the user can exercise with the battery energy usage tool. The manual energy planning feature will not only enable the user to simply select EV/HEV driving mode, but allows the user to actively plan the battery electric energy reference profile for the trip.

Figure 3:
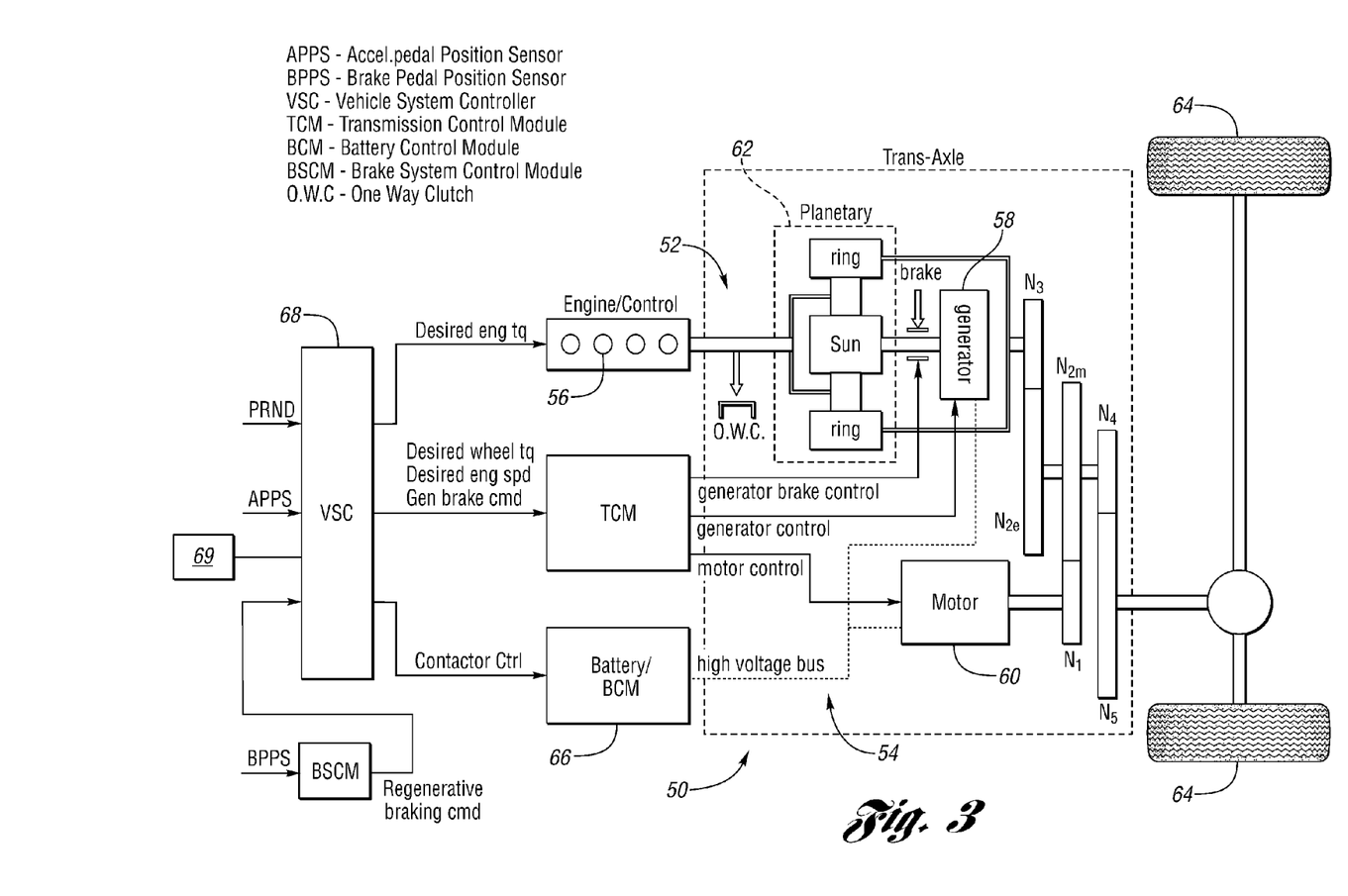
FIG. 3 shows a schematic sketch of a powershift hybrid electric vehicle powertrain capable of employing various embodiments of the present invention.
Figure 4:
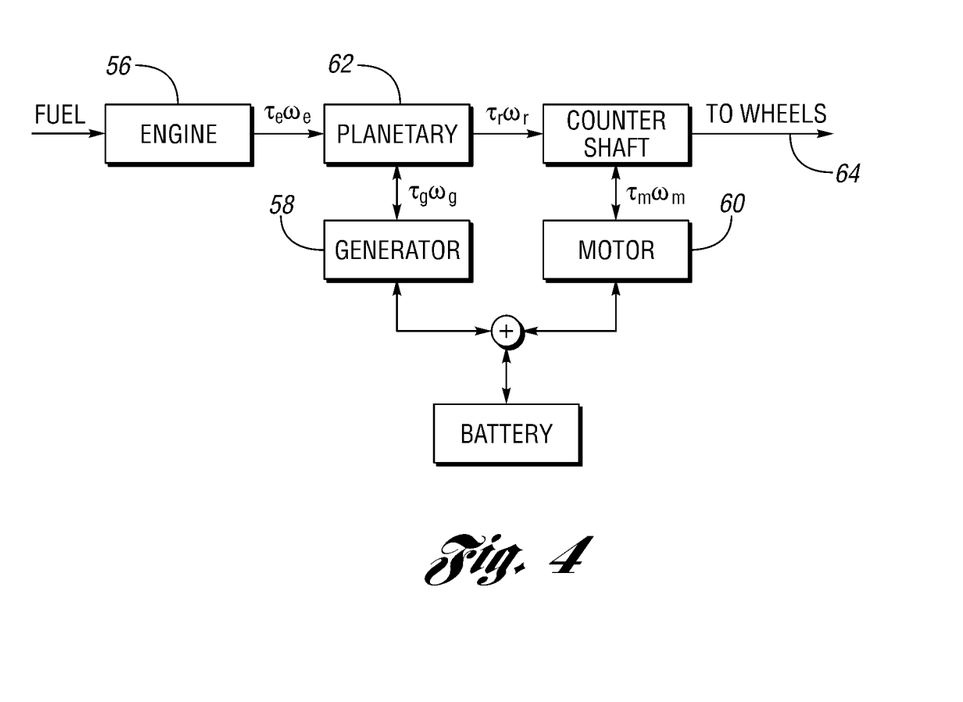
FIG. 4 shows a schematic sketch of the power flow between the powertrain components of FIG. 3.

One example of a power split HEV capable of acting as a PHEV is shown in FIGS. 3 and 4. FIG. 3 illustrates a power split hybrid electric vehicle (HEV) 50 powertrain configuration and control system, which is a parallel hybrid electric vehicle. In this powertrain configuration, there are two power sources 52, 54 that are connected to the driveline: 1) the first power source 52 which is a combination of engine and generator subsystems using a planetary gear set to connect to each other, and 2) the second power source 54 which is the electric drive system (motor, generator, and battery subsystems). The battery subsystem is an energy storage system for the generator and the motor. FIG. 4 shows the possible power flows in this powertrain configuration 50.

In the first power source 52, as shown in FIG. 4, the engine output power can be split into two paths by controlling the generator-mechanical path $t_r\omega_r$ (from the engine 56 to the carrier to the ring gear to counter shaft), and electrical path $\tau_g\omega_g$ to $\tau_m\omega_m$ (from the engine 56 to the generator 58 to the motor 60 to the counter shaft).

The generator speed will change according to the vehicle speed for a definite desired engine speed, and the engine speed can be decoupled from the vehicle speed. The changing generator speed will vary the engine output power split between its electrical path and mechanical path. In addition, the control of engine speed results in a generator torque to react against the engine output torque. It is this generator reaction torque that conveys the engine output torque to the ring gear of the planetary gear set 62, and eventually to the wheels 64. This mode of operation is called "positive split". Because of the mentioned kinematics property of the planetary gear set 62, the generator 58 can possibly rotate in the same direction of its torque that reacts against the engine output torque. In this operation, the generator 58 inputs power (like the engine) to the planetary gear set 62 to drive the vehicle. This operation mode is called "negative split". As in the case of the positive split mode, the generator torque resulting from the generator speed control reacts to the engine output torque and conveys the engine output torque to the wheels 64. This combination of the generator 58, motor 60 and planetary gear set 62 is analogous to an electro-mechanical CVT. When the generator brake (shown in FIG. 3) is actuated (parallel mode operation), the sun gear is locked from rotating and the generator braking torque provides the reaction torque to the engine output torque. In this mode of operation, all the engine output power is transmitted, with a fixed gear ratio, to the drivetrain through the mechanical path only. The diagram of FIG. 4 shows the power flow for the powertrain configuration of FIG. 3.

In a vehicle with a power split powertrain system, unlike conventional vehicles, the engine 56 requires either the generator torque resulting from engine speed control or the generator brake torque to transmit its output power through both the electrical and mechanical paths (split modes) or through the mechanical path only (parallel mode) to the drivetrain for forward motion.

During operation using the second power source 54, as shown in FIG. 4, the electric motor 60 draws power from the battery 66 and provides propulsion independently from the engine 56 to the vehicle for forward and reverse motions. This operating mode is called "electric drive". In addition, the generator 58 can draw power from the battery 66 and drive against a one-way clutch coupling on the engine output shaft to propel the vehicle forward. The generator 58 can propel the vehicle forward alone when necessary, and this mode of operation is called generator drive mode.

The operation of this power split powertrain system, unlike conventional powertrain systems integrates the two power sources 52, 54 to work together seamlessly to meet the user's demand without exceeding the system's limits (such as battery limits) while optimizing the total powertrain system efficiency and performance. Coordination control between the two power sources is needed.

As shown in FIG. 3, there is a hierarchical vehicle system controller (VSC) 68 that performs the coordination control in this power split powertrain system. Under normal powertrain conditions (no subsystems/components faulted), the VSC 68 interprets the user's demands (e.g. PRND and acceleration or deceleration demand), and then determines the wheel torque command based on the user demand and powertrain limits. In addition, the VSC 68 determines when and how much torque each power source needs to provide in order to meet the user's torque demand and achieve the operating point (torque and speed) of the engine. The VSC 68 (or electronic control unit (ECU) is connected to or integrated with a human-machine interface 69, or user interface. The user interface 69 can include a touch screen and/or a series of tactile buttons along with a screen and/or gauges for displaying information to the user.

The VSC 68 may receive signals or inputs from various sources to control the vehicle. These inputs include a user selected vehicle mode and a vehicle state such as battery state, fuel level, engine temperature, oil temperature, tire pressure, and the like. Route and map information may also be provided to the VSC 69 and the navigation system including the vehicle's spatial position, the road system, zoning information for various regions or roadways, such as a low emissions zone or a highway or city zone, and speed ranges for the various roadways. Route and map information may also include terrain information along the trip route such as road grades, road curves, and the like.

Real-time traffic updates may also be provided. The environmental state may also be provided to the VSC 69 and includes the ambient temperature and/or humidity, and any environmental alerts such as an ozone alert or smog alert.

Figure 6:
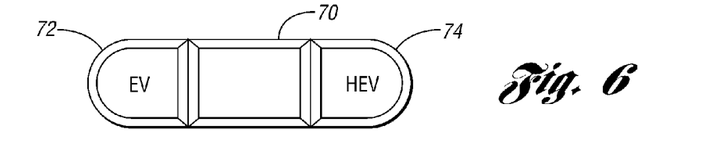
FIG. 6 is a schematic illustration of the "I-Trip" mode selection interface.

The "i-Trip" feature is triggered when the user presses the "i-Trip" button 70 (see FIG. 6), which launches the trip planning program. The trip planning program consists of a trip planning algorithm and a trip advisor application with the trip planning information center. The trip advisor application acts as a tutor to help the user plan his/her trip. It also helps the user to segment the trip into sections and allow him/her to apply desired vehicle operation modes for different segments of the trip. In some embodiments, the user may also be able to directly select EV or HEV modes of operation using buttons 72, 74, respectively, located adjacent to the i-Trip button 70. The buttons 70, 72, 74 may be tactile buttons located on the vehicle dashboard, may be touchscreen buttons located on a human machine interface 69, or the like.

Using the iTrip feature, the user has the ability to actively manage the energy usage of the vehicle along a planned trip, for example, using a human machine interface (HMI) screen. The user may enter as much information as is known regarding the trip into the HMI and VSC. The user may manually generate a reference SOC profile for the trip domain to fit the user's vehicle usage preferences. The VSC may control the overall battery usage along the trip using static and dynamic vehicle and transportation information as well as the user's inputs. A trip domain battery energy allocation plan and an SOC reference profile are generated. The PHEV controls the energy management and switches the PHEV between the various vehicle operating modes and between EV/HEV/Crtl'd modes to follow the SOC reference profile. The HEV button 74 provides for battery charge sustaining (CS) at or near the current battery SOC level within an operation range.

The EV button 72 provides for PHEV operation using electrical energy from the battery. The PHEV operates in charge depletion (CD) mode. The engine may be pulled up by the VSC beyond predetermined vehicle power or speed thresholds.

Figure 5:
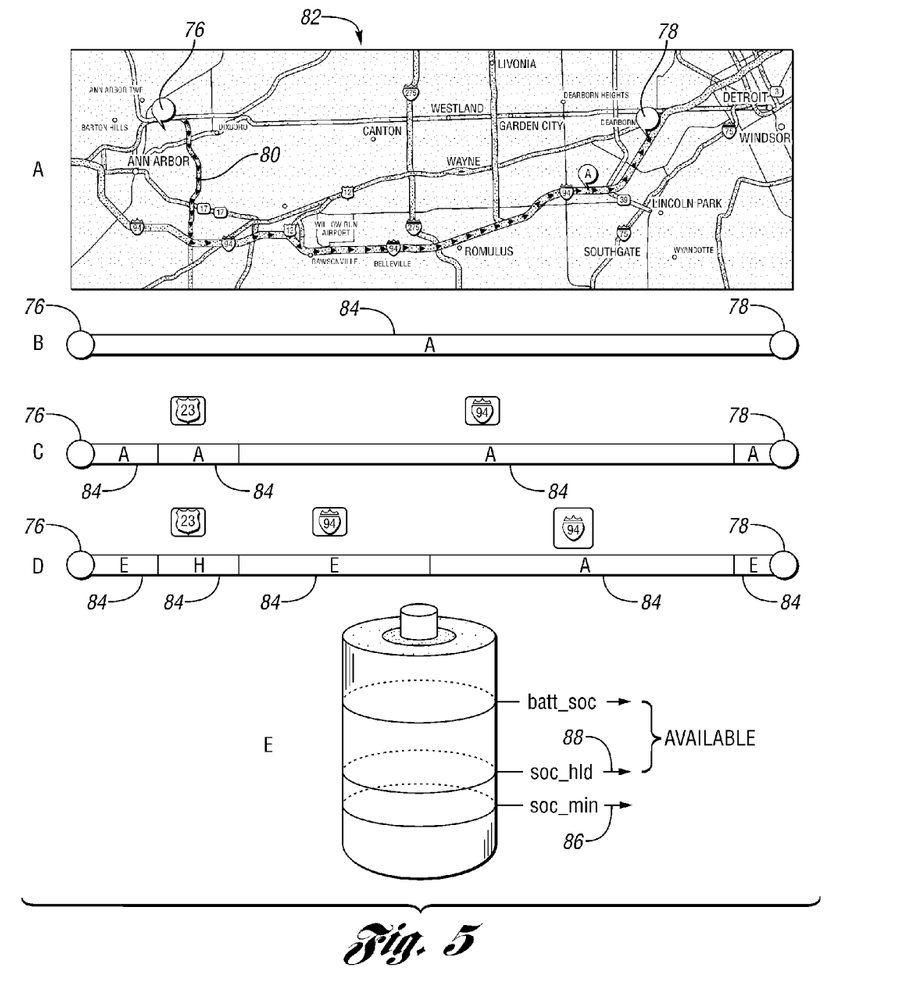
FIG. 5 (A,B,C,D,E) shows a trip advisor with: A, trip from navigation system; B, linear representation of trip; C, automatic suggested portioning; D, manually selected operating modes and additional partitioning; and E, an illustration of the battery SOC levels during a typical driving cycle of a powertrain according to an embodiment.

In order to plan a trip, a user selects the trip button 70 and enters a destination location 78. The starting location 76 is the location of the vehicle, although another starting location may be entered into the system by the user. The trip planning system and the navigation system are connected to the VSC 68. The trip location information 76, 78 and potential route 80 for the current planned trip 82 is fetched from the navigation system and is displayed on the vehicle's screen (see FIG. 5 (A-D)). The trip 82 is represented in a linear distance-based representation where the user can divide the trip into segments, and assigned specific vehicle operation modes for different segments. For example, FIG. 5B has one segment 84, FIG. 5C has 4 segments 84, and FIG. 5D has 5 segments 84. Of course, any number of segments is contemplated.

The default PHEV mode is "Automatic" (A) which means that the trip advisor program is in control over the energy management and will try to optimize the battery usage to bring optimal fuel economy for the whole trip 82. Initially, the trip 82 is categorized as (A), as shown in FIG. 5B, which is equivalent to applying the Ctrl'd operating mode across the trip 82 to deplete the battery 66 completely during the trip 82, such that the battery 66 is at or near the min_soc at the destination 78.

Initially the whole trip 82 will be one section 84, but as the user divides the trip 82 into multiple sections 84, each section 84 may also be assigned one of the modes EV (E) and HEV (H), as shown in FIG. 5D. The trip advisor program will also help the user to resolve impossible user selections (with respect to the available battery 66 power) and to suggest alternative trip partitioning and battery SOC usage plan for better energy/fuel economy and reduced emissions control criteria.

When the user has given his/her input, the trip planning algorithm will apply the Ctrl'd operating mode for all the Automatic (A) segments. The battery 66 charge usage rate of the Ctrl'd operating mode sections are calculated so that the battery 66 charge will be depleted to a soc_min level after the trip 82, while the requirements on any manually selected sections are still met. The trip pre-planning principles are applied as described below.

The battery energy is to be depleted as much as possible down to the soc_min 86 as shown in FIG. 5E before the end of a charge cycle and as early as possible while providing the energy usage flexibility. The battery SOC level at the end of a charge cycle will be at the default charge sustaining SOC level (soc_cs_min) 86 or the battery SOC hold level (soc_hld_dvr) 88 if the user commanded battery SOC hold feature is activated, or at its achievable lowest level.

Assuming that no section has been defined as "battery charge from fuel energy" (battery SOC increase profile), which will charge the battery to increase the SOC using the engine and fuel energy, the battery SOC setpoint between sequential segments will always be the same or lower than the previous setpoints (see FIG. 5E). The battery SOC increase may occur if the user chooses to actively charge the battery from the fuel to achieve a certain higher battery SOC level within the allowable limit.

The battery energy usage pre-planning does not violate the battery operation limits (the battery upper charge limit, the battery charge sustaining upper limit and the battery charge sustaining lower limit 86). Any preferred (H) mode, which acts as a CS mode, is therefore overridden while the battery SOC is above battery charge sustaining upper limit such that the battery SOC is reduced during the segment until below the upper limit, and then the H mode may commence.

The estimated battery consumption by the (E) segments 84 is calculated. The remaining available battery capacity is then divided between any Ctrl'd or (A) segments 84 in the trip 82.

After the trip 82 pre-planning, based on the user selections (and any available optional real-time traffic and transportation information and advanced map information), the trip advisor program (which may also resolve conflicts and selections that the available energy cannot meet) creates an operation mode-map and an optimal charge reference profile to be used by the energy management. The trip planning algorithm collects and completes various calculations and pre-planning The trip 82 or charge cycle is partitioned into sections, or segments 84. An expected vehicle operation mode is associated with section 84, such as EV, HEV or Ctrl'd. An amount of battery energy is allocated to each section 84 in the form of delta SOC or an absolute SOC number, i.e. the expected SOC level at the end of each segment with respect to the initial SOC at the beginning of the segment. If the trip destination 78 is equipped with a battery charge station, the battery SOC is expected to be depleted as much as possible down to the soc_cm_min level 86, seen in FIG. 5E. Otherwise, the user may provide an estimated SOC value for the end of the trip 78.

For an EV mode of vehicle operation (E), the delta SOC or the segment terminal SOC value may be estimated by the trip planning algorithm based on approximated driving distance in the segment 84.

For an HEV mode of vehicle operation (H), the delta SOC is zero or approximately zero, and the terminal SOC of a segment 84 is the same or approximately the same as the initial SOC value for that same segment 84.

For the Ctrl'd mode of vehicle operation (A), the delta SOC is determined based on the total planned energy usage for the trip 82 where each A segment 84 is allocated a weighted portion of the available battery charge after the energy consumption for any EV sections 84 have been deducted from the amount of available energy to be apportioned to the A segments 84. The weighting of the portions for the A segments is based on distance, or another metric of the segments 84 and trip 82.

The user may select the level of detail of the trip planning The basic case is to only activate the feature, i.e. by activating the iTrip button 70, or by inputting a route into a navigation system or the like, in which case the trip 84 will be automated into Ctrl'd mode (A), and the available battery charge is used in an optimal way during the entire trip 82 distance. The user may provide further detail by segmenting the trip and assigning specific modes into selected and/or all segments 84, in which case the trip advisor program will automatically assign modes to the non-assigned, unselected segments 84 to enable the requested driving modes in the selected segments 84, and prevent the user from creating an impossible combination of vehicle modes and segments with the available energy in the battery. The user may also set a desired SOC level at the end of one or more segments 84 or for the trip 82.

Figure 7A:
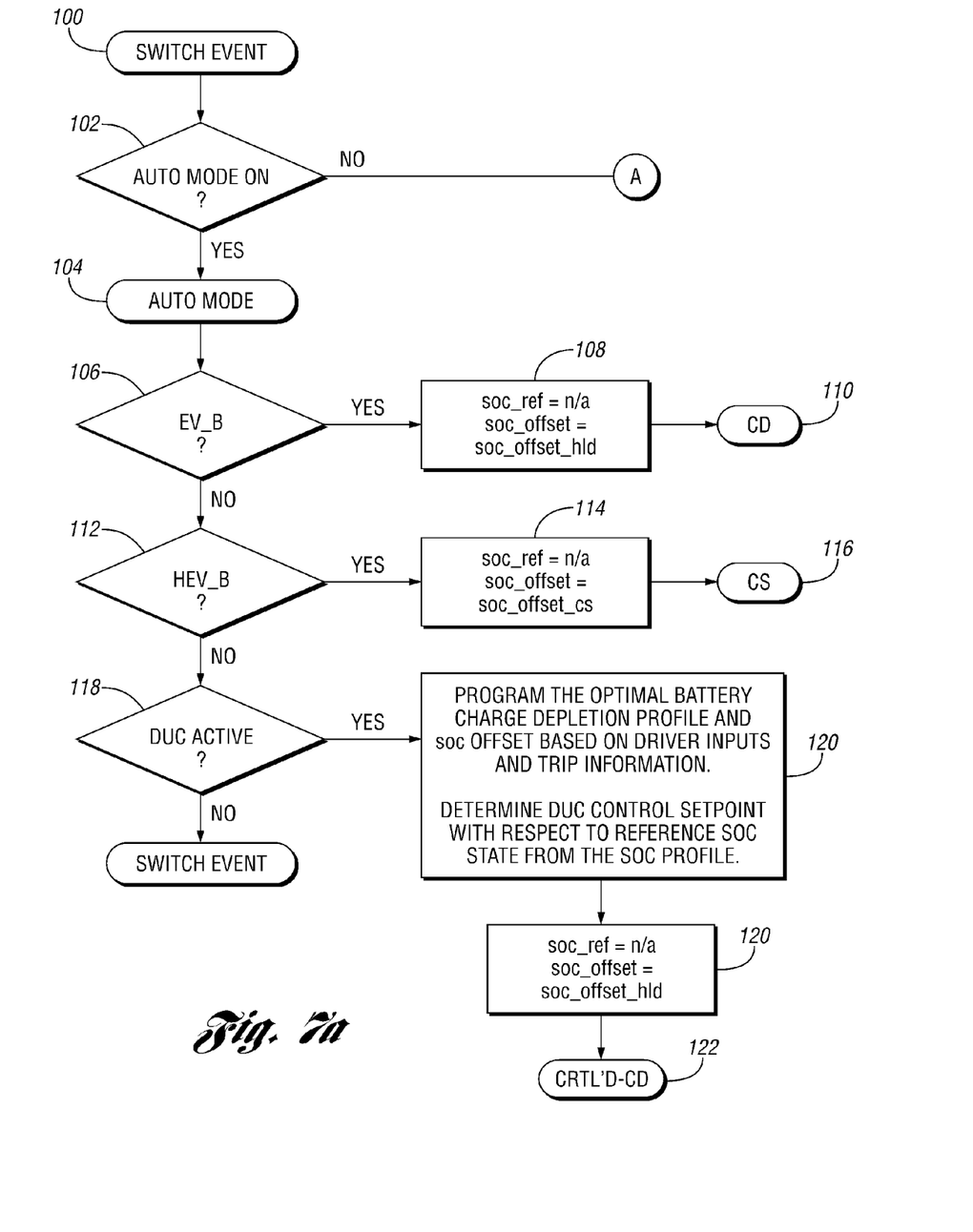
FIG. 7 shows a flow diagram for a PHEV operation mode and battery energy control parameter selection.
Figure 7B:
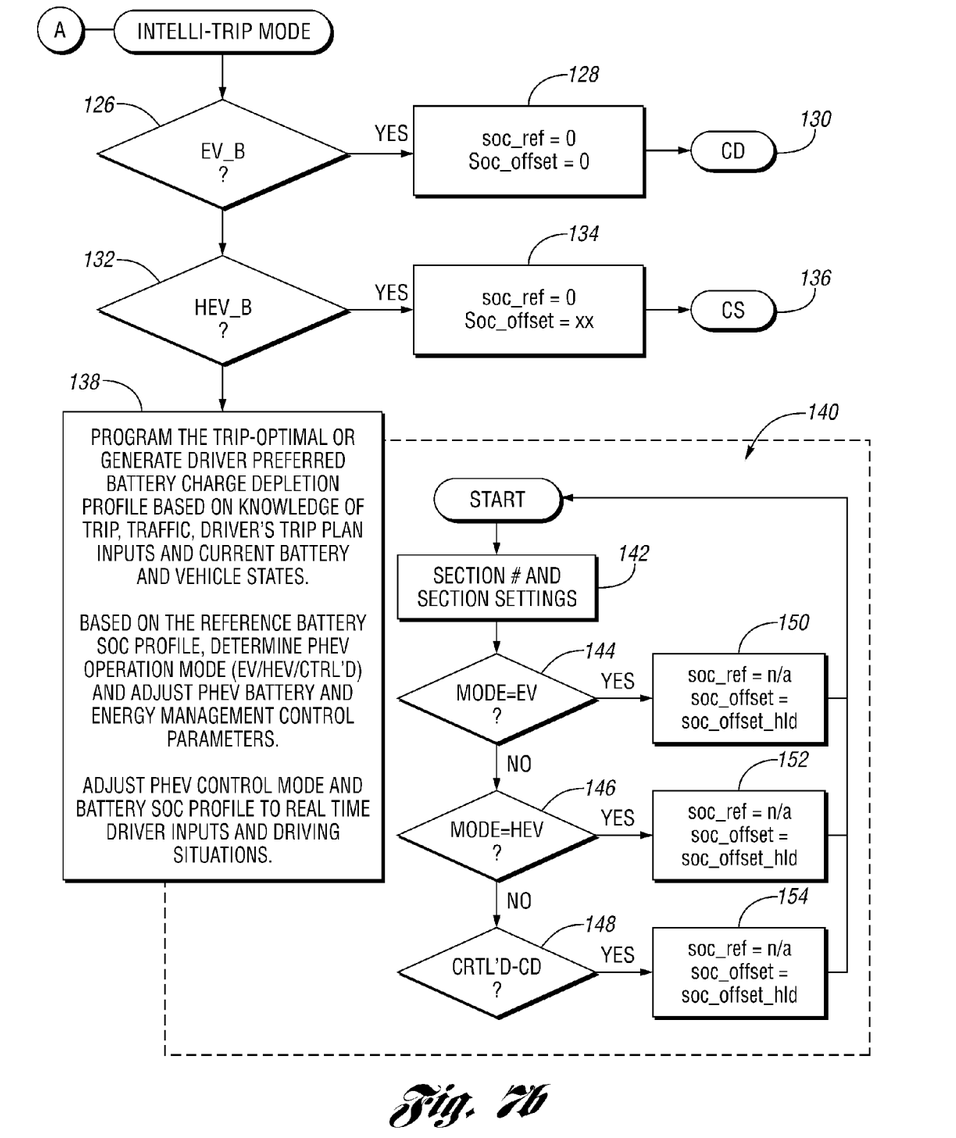

FIGS. 7a and 7b are a strategy flow chart for the trip planning algorithm. For instance, when the user selects the automatic battery charge mode using the interface switch 70 seen in FIG. 6, the maximum rate of charge depletion occurs. The vehicle then is propelled mainly by battery power. The engine is used only if battery power depletion or vehicle speed thresholds are reached.

FIG. 7b is a strategy flow chart for instances when the user selects a user input based on the user's knowledge of trip condition, such as traffic conditions and other user inputs.

In FIG. 7a, the switch event 100 occurs when the button 70 is activated, or by an alternate method, i.e. the user entering a destination into a navigation system, or the like. The algorithm determines if it is in an automatic mode at 102.

If the algorithm is in an automatic mode, shown at 104, the algorithm determines if the vehicle is in an EV mode at 106, and if so, sets the reference SOC and the offset of the SOC at 108, and operates the vehicle in a charge depleting mode, or EV mode at 110. The SOC offset is an energy reservation level which acts as a floor for the SOC of the battery. For EV mode, the offset is set to soc_offset_hld which is at or above the minimum SOC level for the battery.

If the vehicle is not in an EV mode, the algorithm determines if the vehicle is in an HEV mode at 112, and if so, sets the reference SOC and the offset of the SOC at 114, and operates the vehicle in a charge sustaining mode, or HEV mode at 116. The offset is set to a CS, which sets the offset to the current battery SOC level (if within an acceptable charge range) to reserve the available battery energy.

If the vehicle is not in an HEV mode, the algorithm determines if distance until charge (DUC) is active at 118, and if so, programs an optimal or near optimal battery charge depletion profile and SOC offset based on user inputs and trip information at 120.

The algorithm determines the DUC control setpoint with respect to the reference SOC state from the corresponding reference profile for the SOC at 120. The algorithm selects the appropriate reference SOC and offset of the SOC at 120, where the offset is at or above the minimum SOC level for the battery. The algorithm then operates the vehicle in a Crtl'd mode at 122.

If the automatic mode is not selected in the algorithm at 102, the algorithm enters the intelligent trip mode 124, as shown in FIG. 7b.

If the algorithm is in an EV mode, shown at 126, the algorithm sets the reference SOC and the offset of the SOC at 128 to zero such that there is no additional energy reservation level above the battery limitations. The algorithm operates the vehicle in a charge depleting mode, or EV mode at 130.

If the vehicle is not in an EV mode, the algorithm determines if the vehicle is in an HEV mode at 132, and if so, sets the reference SOC and the offset of the SOC at 134, and operates the vehicle in a charge sustaining mode, or HEV mode at 136. The offset is set to a reservation level to provide for CS mode.

If the vehicle is not in an HEV mode, the algorithm programs the trip optimal or user selected charge depletion profile at 138. The algorithm uses inputs which include trip locations and route information, traffic information, user trip plan inputs, and vehicle states such as battery state and other vehicles states. The algorithm or the user may select various segments for the trip based on road type, area, emissions information, and the like. For example, one segment may be selected for a residential street, another segment for a city boulevard, and another segment for a highway. Of course, any number of segments and reason for assigning the segment are contemplated.

The algorithm, uses the reference battery SOC profile to determine the vehicle operation mode (EV, HEV, CAN) for each segment or the trip, and adjusts various battery and energy management control parameters. The algorithm also may adjust the reference profile, the vehicle control mode, and the battery SOC profile en route, for example based on a real time user input or driving situation, such as new traffic information or a route change.

The algorithm uses a subroutine 140 to assign a mode to each segment. Each segment is selected and given settings at 142. The algorithm or user can select a EV mode at 144, a HEV mode at 146, and a Crtl'd mode at 148. For each mode 144, 146, 148, there is a reference SOC and offset of the SOC that is set at 150, 152, 154, respectively. The offset provides for a minimum battery level for the section or segment. Once the mode is selected for the segment, the subroutine 140 allows the selection of another trip segment.

Figure 8:
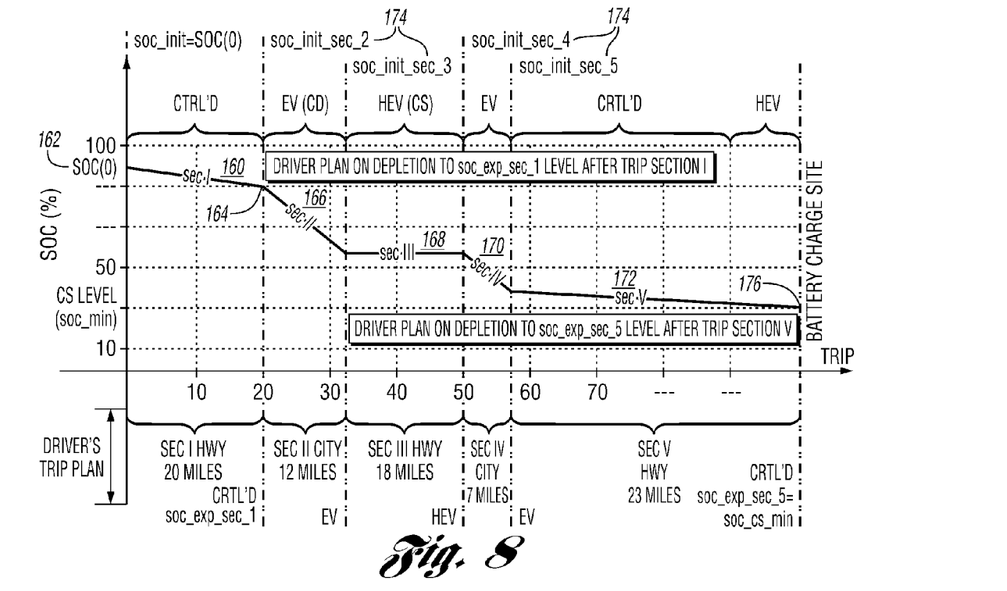
FIG. 8 shows an example of a user oriented battery energy consumption trip plan for overall trip planning.
Figure 9:
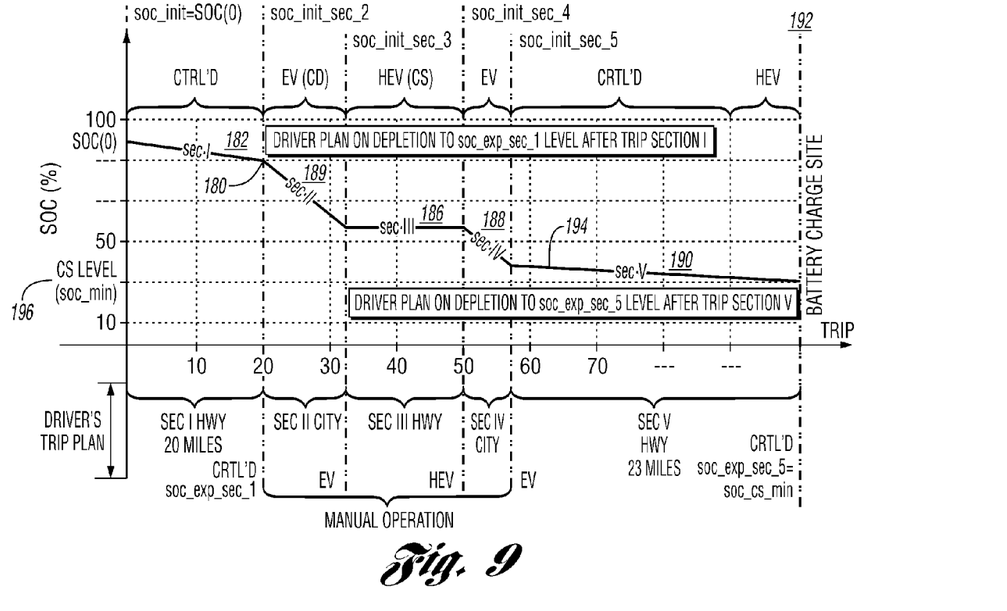
FIG. 9 is a SOC/distance plot of a user-oriented battery energy consumption trip plan for partial trip planning.
Figure 10:
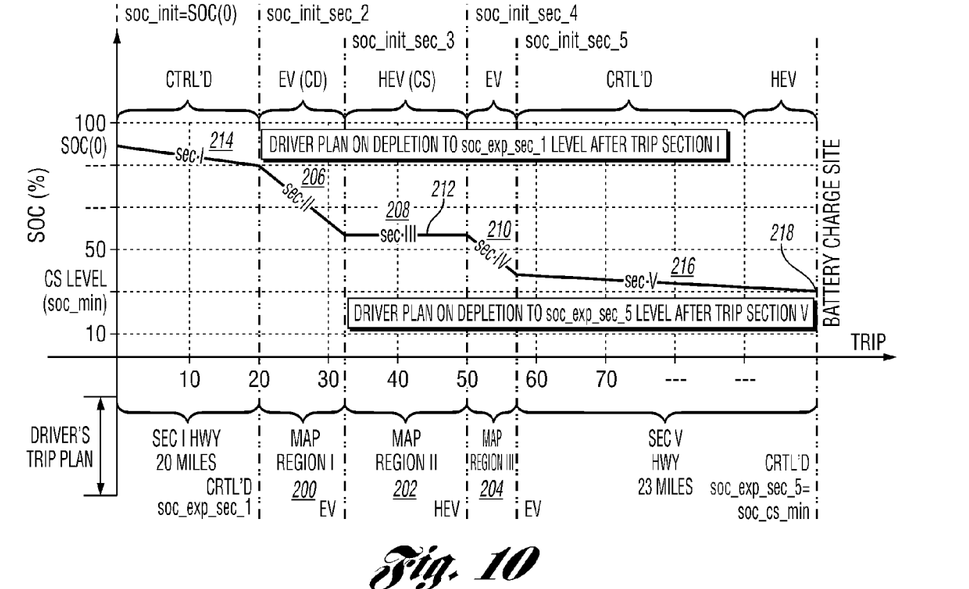
FIG. 10 is a SOC/distance plot of a user-oriented battery energy consumption trip plan for regional segments.

FIGS. 8, 9 and 10 show examples of "I-Trip," user-oriented trip plans when the user provides trip pre-planning In each example, the user has partitioned the trip into segments.

In the first example in FIG. 8, in the first segment 160, which is a 20 miles long highway section, the user desires to deplete the battery energy to a specific degree—from the initial SOC level SOC(0) 162, which may or may not be a maximum charge for the battery, to the segment terminal SOC level, soc_exp_sec_1 164. This implies that Ctrl'd operation mode will be commanded by the algorithm such that the resulting battery SOC usage rate meets the respective SOC end points of the segment 160 with respect to the travel distance in this section 160. In the three consecutive Sections II-IV, the user only selects vehicle operation modes (EV or HEV). Section II 166 and Section IV 170 are both city driving segments and EV mode is selected. Section III 168 is a highway section and HEV operation is selected. The algorithm estimates the SOC values at the end of each section, and uses these values as the initial SOC level for the next sections, as shown by the dashed lines 174 in the Figure. The final Section V 172 starts at whatever residual SOC level is after Section IV and the algorithm selects the Ctrl'd operation mode to follow the battery charge against a reference profile until the default battery charge sustaining level is reached at soc_min 176 at the end of the trip. If the vehicle continues to operate after the end of the Ctrl'd Segment V 172, the vehicle will operate in HEV mode (CS).

In the second example of FIG. 9, the user only inputs the desired terminal SOC level 180 for Section I 182, i.e. the soc_exp_sec_1 is decisively determined by the user. After that, the user manually switches the vehicle operation mode according to his/her needs and preferences, and the route for the consecutive segments of the trip. Initially the trip advisor algorithm may see Sections II-V 184, 186, 188, 190, respectively, as one continuous section of Automatic (A) mode where it configured Ctrl'd operation to deplete the battery energy linearly until the end of the last section (dotted line 192). However, as the user presses the EV and HEV buttons while the vehicle is operating in Section II-IV 184, 186, 188, the "i-Trip" feature, and automatic selection, is temporarily overridden as the vehicle is operated directly in the desired modes selected by the user. When the vehicle is at the end of Section IV 188, the user again enables the "i-Trip" button which will cause the trip advisor algorithm to re-calculate the reference battery SOC reference profile 194 to account for the current SOC level at the end of Section IV and apply Ctrl'd mode with an updated battery usage rate in order to meet the target SOC level soc_min 196 at the end of the trip.

It is noted that for the example as described in FIG. 9, the user did not provide the complete trip partition and all of the segments and assigned modes in advance. Instead, the user only defined the first segment 182 and associated battery energy consumption percentage. The remainder of the trip segments were determined when the user manually changed the operation mode while the vehicle was en route. For the sake of comparison to FIG. 8, the user just happened to push the buttons so that the segments matched with the segments of the previous example.

In the third example of FIG. 10, the user does not manually define the lengths of the second, third and fourth sections of the trip. Instead, the user has provided in advance three regional areas 200, 202, 204, respectively, in the navigation system map and assigned default operation modes for these areas, or alternatively software in the navigation system has defined these regional areas. Specified default vehicle operation mode are expected to be used whenever the vehicle is operated within those regional areas, provided the vehicle state permits operation within the areas. The trip advisor program combines the trip information from the navigation system and automatically creates the corresponding sections and assigns the respective operating modes, shown here as Section II, III, and IV as 206, 208, 210, respectively. A preliminary battery SOC reference profile 212 is generated accordingly. However, the trip advisor program monitors the current vehicle position and performs re-planning each time a map-based boundary has been crossed, and creates a new updated battery charge strategy and profile based on the current actual SOC levels and vehicle state. The user input a SOC level for the end of Segment I 214, causing a Ctrl'd segment 214. Segment V 216 is also a Ctrl'd mode of operation based on the SOC at the end of Segment IV 210, and the soc_min 218 or a user entered value for the SOC at the end of the trip. If the vehicle continues to operate after the end of the trip, the algorithm will cause the vehicle to operate in HEV (CS) mode, until the vehicle reaches the next charging station. Again, for sake of comparison, the user just happened to push the buttons so that the segments matched the previous examples shown in FIGS. 8 and 9.

A vehicle operation mode and battery energy management feature enables the user to apply their knowledge about a trip in advance to be actively involved in the vehicle operation mode selection and battery energy usage planning in the trip domain. The user or the algorithm may define one or more segments with the trip. A reference battery SOC profile will be generated by this feature based on the user's input and the route. The internal vehicle system control (VSC) will switch the vehicle operation modes to control the battery energy usage rate to follow the reference battery usage profile. The user also has the option to override this feature by directly selecting an operation mode between EV/HEV, or by entering a desired battery SOC end state for a segment or the trip, causing a Ctrl'd mode. By doing this, the vehicle operation flexibility is further extended. Furthermore, the user also has the opportunity to optimize the vehicle battery energy usage in order to maximize the fuel economy as he/she gets more and more familiar with the vehicle operational characteristic and trips.

The vehicle has a feature incorporated into the VSC and the human machine interface that allows a user to manually select an operation mode of EV/HEV for the vehicle. The feature allows the user to generate a battery energy reference profile in the trip domain. The feature allows the user to pre-determine the vehicle operation mode among EV, HEV and Ctrl'd modes in the trip domain for a charge cycle. The trip planning program and trip advisor algorithm partitions a trip/charge cycle into sections according to user's selection or known route information and completes the whole partitioning further based on driving patterns. The trip planning program and trip advisor algorithm generate an improved energy usage vehicle modes sequence and battery SOC reference profile by completing the energy usage plan based on the user's energy usage planning or through an automatic sequence.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a hybrid vehicle comprising:
   in response to receiving a user assigned mode for a segment of a trip route from a user interface, generating a charge reference profile of a battery coupled to an electric motor based on the trip for another segment of the trip route;
   commanding the electric motor and an engine based on a location of the vehicle with respect to the trip route; and
   commanding the electric motor and the engine to operate in a limited charge depletion mode to a target state of charge of the battery such that a state of charge of the battery follows the reference profile based on the location of the vehicle being in the another segment.

2. The method of claim 1 further comprising assigning the target state of charge of the battery to an end of the another segment.

3. The method of claim 1 further comprising providing suggested segments to a user through the user interface, wherein the segments are partitioned based on driving patterns.

4. The method of claim 1 further comprising providing an alternate trip route for selection through the user interface to provide an increase in vehicle fuel economy.

5. The method of claim 1 further comprising receiving predefined trip zoning information for use in generating the charge reference profile.

6. The method of claim 5 further comprising overriding the user assigned mode such that the state of charge of the battery remains within operating thresholds.

7. The method of claim 1 further comprising updating the reference profile based on a trip route change en route.

8. The method of claim 1 wherein the user assigned mode is charge sustaining.

9. The method of claim 8 wherein the user assigned mode is for an intermediate trip segment.

10. The method of claim 1 wherein the user selected mode is charge depleting at a maximum allowable discharge rate for the battery.

11. A method of controlling a vehicle comprising:
    partitioning a selected trip route into segments;
    assigning an operational mode to each segment thereby creating a distance mode-map, wherein one segment is a limited charge depletion (LCD) mode; and
    commanding first and second propulsion devices to operate in the LCD mode to a target battery state of charge such that a battery state of charge follows a reference profile when the vehicle is in the one segment.

12. The method of claim 11 further comprising:
    assigning an electric-only mode to another of the segments;
    calculating an amount of battery power used by the electric mode segment and the LCD mode segment; and
    allocating a distance weighted portion of a remaining amount of battery power to each of the remaining segments.

13. A vehicle comprising:
    an electric motor;
    a battery coupled to the electric motor;
    an engine, wherein the electric motor and the engine are coupled to wheels of the vehicle via a transmission;
    a user interface configured for a user to select a trip route for the vehicle; and
    an electronic control unit (ECU) coupled to the user interface, the electric motor, the battery, and the engine, wherein the ECU is configured to (i) in response to receiving a user assigned mode of operation for a segment of the trip route, generate a charge reference profile for another segment of the trip route that incorporates a battery charge usage set by the segment and a target battery state of charge at an end of the trip route, (ii) command the electric motor and the engine to the user assigned mode of operation in the segment, (iii) command the electric motor and the engine to operate in a limited charge depletion mode such that a state of charge (SOC) of the battery tracks the reference profile when the vehicle is located in the another segment.

14. The vehicle of claim 13 further comprising a navigation system in communication with the user interface and the ECU.

15. The vehicle of claim 13 wherein one of the user interface and the ECU is configured to partition the trip route into at least one segment.

16. The vehicle of claim 13 wherein the ECU is configured to update the reference profile based on a trip route change en route.

17. The vehicle of claim 13 wherein the user selected mode of operation is a charge sustaining mode.

* * * * *